United States Patent
Wang et al.

(10) Patent No.: US 12,332,732 B2
(45) Date of Patent: Jun. 17, 2025

(54) PIPELINED HARDWARE ERROR CLASSIFICATION AND HANDLING

(71) Applicant: Cryptography Research, Inc., San Jose, CA (US)

(72) Inventors: Bryan Jason Wang, South Lake Tahoe, CA (US); Samatha Gummalla, Dublin, CA (US)

(73) Assignee: Cryptography Research, Inc., San Jose, CA (US)

( * ) Notice: Subject to any disclaimer, the term of this patent is extended or adjusted under 35 U.S.C. 154(b) by 119 days.

(21) Appl. No.: 18/077,943

(22) Filed: Dec. 8, 2022

(65) Prior Publication Data

US 2023/0195553 A1 Jun. 22, 2023

Related U.S. Application Data

(60) Provisional application No. 63/290,343, filed on Dec. 16, 2021.

(51) Int. Cl.
*G06F 11/00* (2006.01)
*G06F 11/07* (2006.01)

(52) U.S. Cl.
CPC ........ *G06F 11/0781* (2013.01); *G06F 11/073* (2013.01); *G06F 11/0793* (2013.01)

(58) Field of Classification Search
CPC . G06F 11/0781; G06F 11/073; G06F 11/0793
See application file for complete search history.

(56) References Cited

U.S. PATENT DOCUMENTS

| | | | |
|---|---|---|---|
| 5,333,274 A * | 7/1994 | Amini | G06F 13/28 714/50 |
| 7,370,230 B1 | 5/2008 | Flake | |
| 7,370,243 B1 | 5/2008 | Grohoski et al. | |
| 8,656,228 B2 * | 2/2014 | Check | G06F 11/0793 714/42 |
| 9,658,919 B2 * | 5/2017 | Pathirane | G06F 11/0751 |
| 10,635,615 B2 * | 4/2020 | Cottam | G06F 13/28 |
| 11,829,237 B1 * | 11/2023 | Schaub | G06F 13/28 |
| 2014/0304573 A1 * | 10/2014 | Dodson | G06F 11/0751 714/807 |
| 2016/0370427 A1 * | 12/2016 | Kreider | G06F 11/27 |
| 2020/0042379 A1 * | 2/2020 | Miyata | G06F 11/079 |

OTHER PUBLICATIONS

Dahad, Nitin, "Andes' Core has RISC-V Vector Instruction Extension", EE Times, Dec. 9, 2019, Downloaded on Oct. 21, 2021 at: https://www.eetimes.com/andes-core-has-risc-v-vector-instruction-extension/#. 3 pages.

* cited by examiner

*Primary Examiner* — Amine Riad
(74) *Attorney, Agent, or Firm* — Lowenstein Sandler LLP

(57) ABSTRACT

Technologies for detecting and classifying errors detected in pipelined hardware are described. One device includes a hardware pipeline with a set of pipeline stages. Error detection logic can detect an error in the hardware pipeline, and control logic can classify the error in one of the multiple categories based on a type of the error, a position of the first data in a data stream that triggered the error, and a position of a pipeline stage in which the error is detected. The control logic can perform an error-response action based on the error classification of the error.

20 Claims, 6 Drawing Sheets

Fatal Hardware error detected in P1 stage at time $t_1$

Data-dependent error detected in P1 stage at time $t_1$

PIPELINED HARDWARE ERROR CLASSIFICATION AND HANDLING

RELATED APPLICATION

This application claims the benefit of U.S. Provisional Application No. 63/290,343, filed on Dec. 16, 2021.

BACKGROUND

Modern computer systems generally include some type of error detection and handling in which a hardware block detects erroneous behavior, performs a corrective action with error handling hardware, and reports information to a software error handler executing on a computer system's processor. Different types of errors may require different corrective actions. A pipelined system can encounter errors at different stages of the pipeline. Conventional solutions halt the entire pipeline in response to encountering errors, potentially affecting antecedent data. For example, when pipelined hardware is processing a stream of data, an error may be detected in an earlier pipeline stage, while later pipeline stages are processing error-free data that is antecedent to the data that triggered the error. This presents some challenges in taking some forms of corrective action, such as allowing antecedent data to complete processing while halting the early pipeline stage and reporting the erroneous data from the earlier pipeline stage.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details, such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or presented in simple block diagram format to avoid obscuring the present disclosure unnecessarily. Thus, the specific details set forth are merely exemplary. Particular implementations may vary from these exemplary details and still be contemplated to be within the scope of the present disclosure.

As described above, conventional solutions halt the entire pipeline in response to encountering errors, presenting some challenges in allowing antecedent data to complete processing while halting the early pipeline stage and reporting the erroneous data from the earlier pipeline stage. Aspects of the present disclosure overcome these challenges and others by providing hardware to classify and handle errors in categories based on the nature of the error (e.g., what caused the error, error type, etc.), a position of the data that triggered the error, and a pipeline stage in which the error was detected. Some errors may require broad and aggressive error-response action, such as halting the entire pipeline immediately. However, some errors may be local to a specific data set, and other data in the pipeline need not be impacted, which may be handled with data-dependent, error-response action. For example, when an error is detected, the hardware transitions to a "PRE-ERROR" state (also referred to herein as an "ERROR RESPONSE" state, allowing for error-response actions to occur before reporting the error to a software error handler or other external systems. The hardware can distinguish between a fatal hardware error and a data-dependent error. The fatal hardware errors may require halting the pipeline immediately. Corrective actions for data-dependent errors can take significant time to complete and may, in turn, trigger another error that should be reported to the software error handler.

Aspects of the present disclosure can classify and handle errors in this manner to provide a benefit of reporting the precise data set that generated the error since multiple data sets may be present in the pipelined system at any given time. Aspects of the present disclosure can classify and handle errors in this manner to provide a benefit of allowing hardware to take data-dependent, error-response actions such as allowing the error-free antecedent data to complete processing in later pipeline stages while halting the early pipeline stage and reporting the erroneous data.

Figure 1:
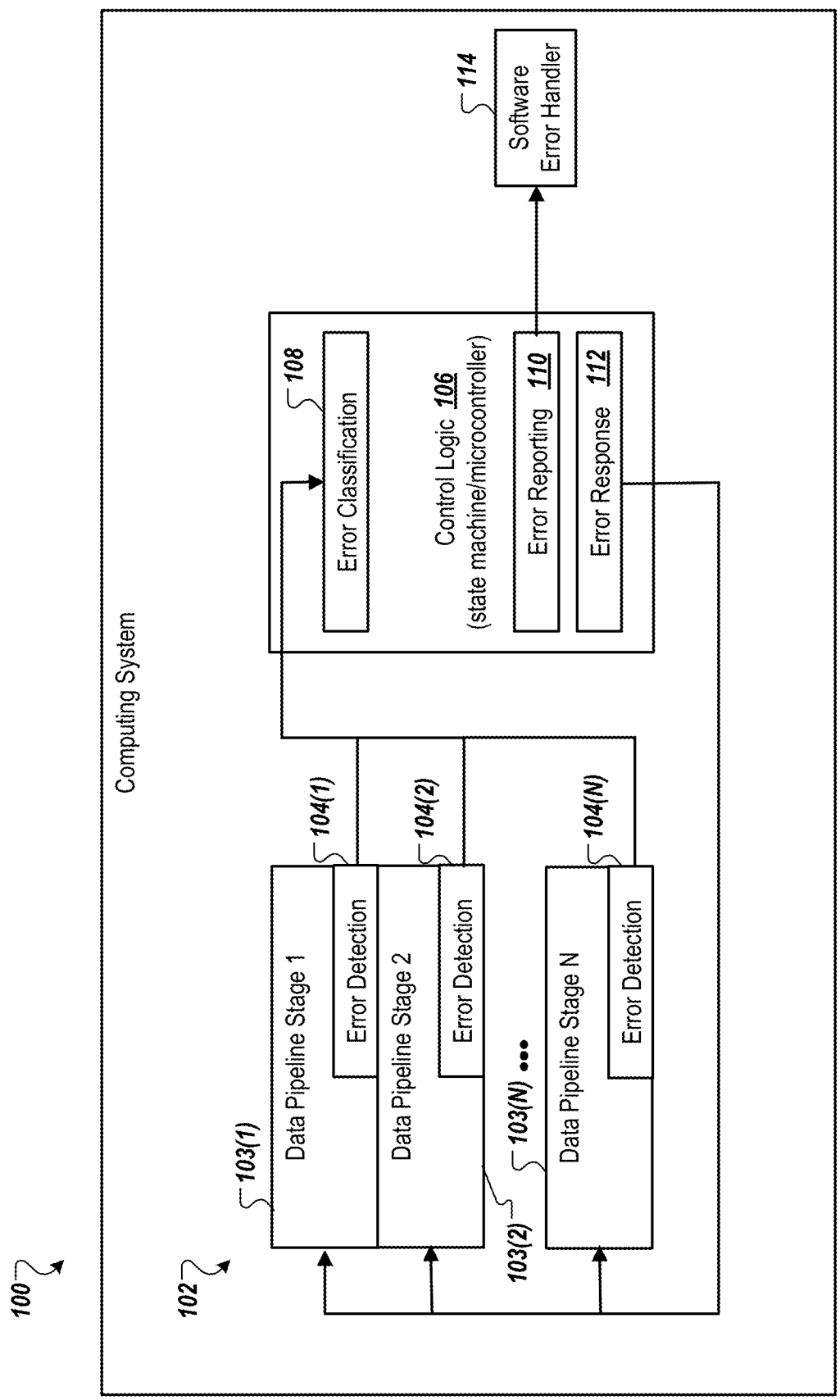
FIG. 1 is a block diagram of a computing system with a hardware pipeline, error detection logic, and control logic to classify and handle errors in the hardware pipeline according to at least one embodiment.

FIG. 1 is a block diagram of a computing system 100 with a hardware pipeline 102, error detection logic 104, and control logic 106 to classify and handle errors in the hardware pipeline 102 according to at least one embodiment. In one embodiment, the computing system 100 is a direct memory access (DMA) device. In another embodiment, the computing system 100 is a security processor. In another embodiment, the computing system 100 is another type of device.

In the illustrated embodiment, the computing system 100 includes a hardware pipeline 102 with N number of pipeline stages 103(1)-(N), where N is a positive integer greater than two. Error detection logic 104 can be coupled to the hardware pipeline 102. In the illustrated embodiment, the pipeline stages 103(1)-(N) each includes error detection logic 104(1)-(N) respectively. In some cases, not all pipeline stages 103(1)-(N) need error detection logic. The error detection logic 104(1) can be configured to detect errors in a first pipeline stage 103(1) using a first error detection technique, and the error detection logic 104(2) can be configured to detect errors in a second pipeline stage 103(2) using a second error detection technique. The first error detection technique and the second error detection technique can be different. During operation, one of the error detection logic 104(1)-(N) can detect an error in the hardware pipeline 102 and report the error to the control logic 106.

The control logic 106 is coupled to each error detection logic 104(1)-(N). The control logic 106 can receive an indication of the error from the error detection logic 104 and classify the error in one of the multiple categories based on the nature of the error (e.g., what caused the error, a type of error, or the like), a position of first data in a data stream that triggered the error, and a position of a pipeline stage in the hardware pipeline 102 in which the error is detected. The control logic 106 can perform an error-response action based on the error classification. In at least one embodiment, the multiple categories can include correctable data errors, uncorrectable data errors, fatal errors, or the like. Based on the classification to a particular category, the control logic 106 can perform an error-response action corresponding to the particular category.

It should be noted that the error-response action can be to correct the data containing the error, but can also include other actions, such as halting the entire hardware pipeline 102, halting one or more pipeline stages 103(1)-(N), or the like. In at least one embodiment, the error response logic 112 can perform a first error-response action, including halting the hardware pipeline responsive to the error being classified as a first category. The first category can specify that the error is a fatal hardware error. The error response logic 112 can perform a second error-response action, including halting the pipeline stage in which the error is detected while allowing pipeline stages, subsequent to the pipeline stage in which the error is detected in the hardware pipeline 102, to continue processing error-free data, responsive to the error being classified as a second category. The second category can specify that the error is a data-dependent error. In another embodiment, the error response logic 112 can perform a third error-response action, including halting the pipeline stage in which the error is detected while allowing one or more pipeline stages, before or after the pipeline stage in which the error is detected, in the hardware pipeline 102 to continue processing error-free data, responsive to the error being classified as a third category. The third category can specify that the error is a data-dependent error. It should be noted that allowing pipeline stages before the pipeline stage in which the error is detected to resume can cause data corruption if the pipeline stage cannot properly store data before the pipeline stage in which the error is detected can resume.

In at least one embodiment, the control logic 106 includes error classification logic 108, error reporting logic 110, and error response logic 112. The error classification logic 108 can classify the error according to one of the multiple categories based on a type of error, a position of first data in a data stream that triggered the error, and a position of a pipeline stage in the hardware pipeline 102 in which the error is detected. The error reporting logic 110 can report the error to a software error handler 114 executing on a central processing unit (CPU) of the computing system 100. In some embodiment, the error reporting logic 110 can also report to the software error handler 114 according to the error classification by the error classification logic 108. For example, the error reporting logic 110 can wait to report the error after one or more error-response actions are performed by the error response logic 112.

The error response logic 112 can perform one or more error-response actions based on the error classification by the error classification logic 108. In at least one embodiment, the error-response action is a data-dependent, error-response action that can be performed when the error is classified as a data-dependent error (e.g., correctable data error) by the error classification logic 108. The data-dependent, error-response action can include attempting to correct the first data in which the error is detected and halting at least the pipeline stage 103 in which the error is detected to allow the first data to be corrected. The data-dependent, error-response action can also allow other pipeline stages to continue to process other data in the hardware pipeline 102. In at least one embodiment, the hardware pipeline 102 can include additional error-free data. The error-free data can be antecedent (referred to herein as antecedent data) to the first data that triggered the error. For example, an error is detected in the first data processed by a first pipeline stage 103(1). A second pipeline stage 103(2) that is subsequent to the first pipeline stage 103(1) contains second data that is error-free. The data-dependent, error-response action can halt the first pipeline stage 103(1) and allow the second pipeline stage 103(2) to continue to process the second data. Similarly, other subsequent pipeline stages can also continue to process additional data already being processed in the hardware pipeline 102. In this embodiment, the error reporting logic 110 can wait until the other pipeline stages have completed processing the additional data before reporting the error in the first data to the software error handler 114.

In at least one embodiment, the error-response action is a fatal error-response action that can be performed when the error is classified as a fatal error by the error classification logic 108. The fatal error-response action can include halting the entire pipeline 102. In this embodiment, the error reporting logic 110 can report the fatal error in the hardware pipeline 102 to the software error handler 114.

In at least one embodiment, the control logic 106 can detect a first error classified as a first category that results in the error response logic 112 to halt one or more pipeline stages 103 and cause one or more pipeline stages 103 to continue to process data. The error detection logic 104 can detect a second error in another pipeline stage 103 of the hardware pipeline 102 after the first error is detected in the hardware pipeline 102. The error classification logic 108 receives a second indication of the second error from the error detection logic 104 and classifies the second error in one of the multiple categories based on the type of the second error, a second position of second data in the data stream that triggered the second error in the subsequent pipeline stage, and a position of the subsequent pipeline stage in the hardware pipeline 102 in which the second error is detected. The error response logic 112 can perform a second error-response action based on the error classification of the second error.

When multiple errors are detected in at least one embodiment, the control logic 106 can determine a priority order of the multiple errors and report only one of the errors based on a priority order associated with the multiple categories. For example, if the first error is a data-dependent error and the second error is a fatal error, the error reporting logic 110 can report only the fatal error to the software error handler 114. In other embodiments, the error reporting logic 110 can report all errors collectively in a batch of errors or sequentially as individual errors. In at least one embodiment, the priority order assigned to the multiple categories can include a first priority level for a first category associated with correctable data errors, a second priority level for a second category associated with uncorrectable data errors, and a third priority level for a third category associated with fatal errors. The third priority level can be higher than the second priority level, and the second priority level can be higher than the first priority level. In another embodiment, the priority order is defined as an error hierarchy in order of increasing severity: 1) correctable data errors for which the control logic 106 does not raise an error, but the control logic 106 can temporarily stall some pipeline stages 103 of the hardware pipeline 102, 2) uncorrectable data errors for which the control logic 106 can partially halt some of the pipeline stages 103 of the pipeline 102 and the control logic 106 can allow the remaining pipeline stages 103 to complete processing antecedent data and reports the data error after completion, and 3) fatal error for which the control logic 106 can halt the entire hardware pipeline 102 and reports the fatal error.

In at least one embodiment, the control logic 106 includes error correction logic (e.g., error correction code (ECC) engine) configured to perform a data-dependent, error-response action on the first data to at least attempt to correct the first data to remedy the error. It should be noted that the data-dependent, error-response action can include a corrective action but can also include other actions that do not necessarily correct the data containing the error. Here, the error correction logic can perform the specific corrective action to correct the data in which the error is detected.

In at least one embodiment, the control logic 106 includes multi-data channel logic to support multiple data channels in the hardware pipeline 102. In another embodiment, the control logic 106 includes out-of-order (OOO) logic to support out-of-order data sets in the hardware pipeline 102.

In at least one embodiment, the control logic 106 includes a buffer structure, such as a first-in, first-out (FIFO) buffer to store error information that can be read by the software error handler 114 once notified of the detected error. In at least one embodiment, the error reporting logic 110 can send a first interrupt to a management processor executing the software error handler 114 responsive to the error classification by the error classification logic 108. The error reporting logic 110 can send a second interrupt or increase a priority level of the first interrupt in response to a second error being detected. In one embodiment, the management processor (or the software error handler 114) can include an interrupt-handling routine to read error information from the buffer structure in the control logic 106.

In at least one embodiment, the control logic 106 can be a microcontroller that includes the error classification logic 108, the error reporting logic 110, and the error response logic 112 or the functionality of this logic. In another embodiment, the control logic 106 is implemented as a hardware state machine, such as the hardware state machine illustrated in FIG. 2.

In at least one embodiment, the first data is being processed in one of the pipeline stages 103(1)-(N), and a subsequent one of the pipeline stages 103(1)-(N) is processing second data. The first data can be part of a same data stream and the second data is antecedent to the first data that triggered the error. The second data is error-free data. In another embodiment, the first data and the second data are part of separate data streams. In at least one embodiment, the first data is a first data set, and the hardware pipeline 102 contains multiple data sets. The multiple data sets can be part of a same stream of data or different data streams. In some cases, the error classification logic 108 can classify the error in the first data based on the position of the first data in the data stream, the position of the pipeline stage 103 in which the error is detected, and the nature or type of the error (fatal error or data-dependent error).

In at least one embodiment, the error response logic 112, in connection with performing an error-response action, can control one or more pipeline stages 103 to complete processing data being processed by the one or more pipeline stages. In at least one embodiment, the error response logic 112 can control one or more pipeline stages 103, subsequent to the pipeline stage 103 in which the error is detected in the hardware pipeline 102, to complete processing antecedent data in the data stream in the hardware pipeline 102. In at least one embodiment, the error response logic 112 can control the one or more pipeline stages 103 before the error reporting logic 110 reports the error to the software error handler 114. In another embodiment, the error response logic 112 can control the one or more pipeline stages 103 concurrently with the error reporting logic 110 reporting the error to the software error handler 114.

Figure 2:
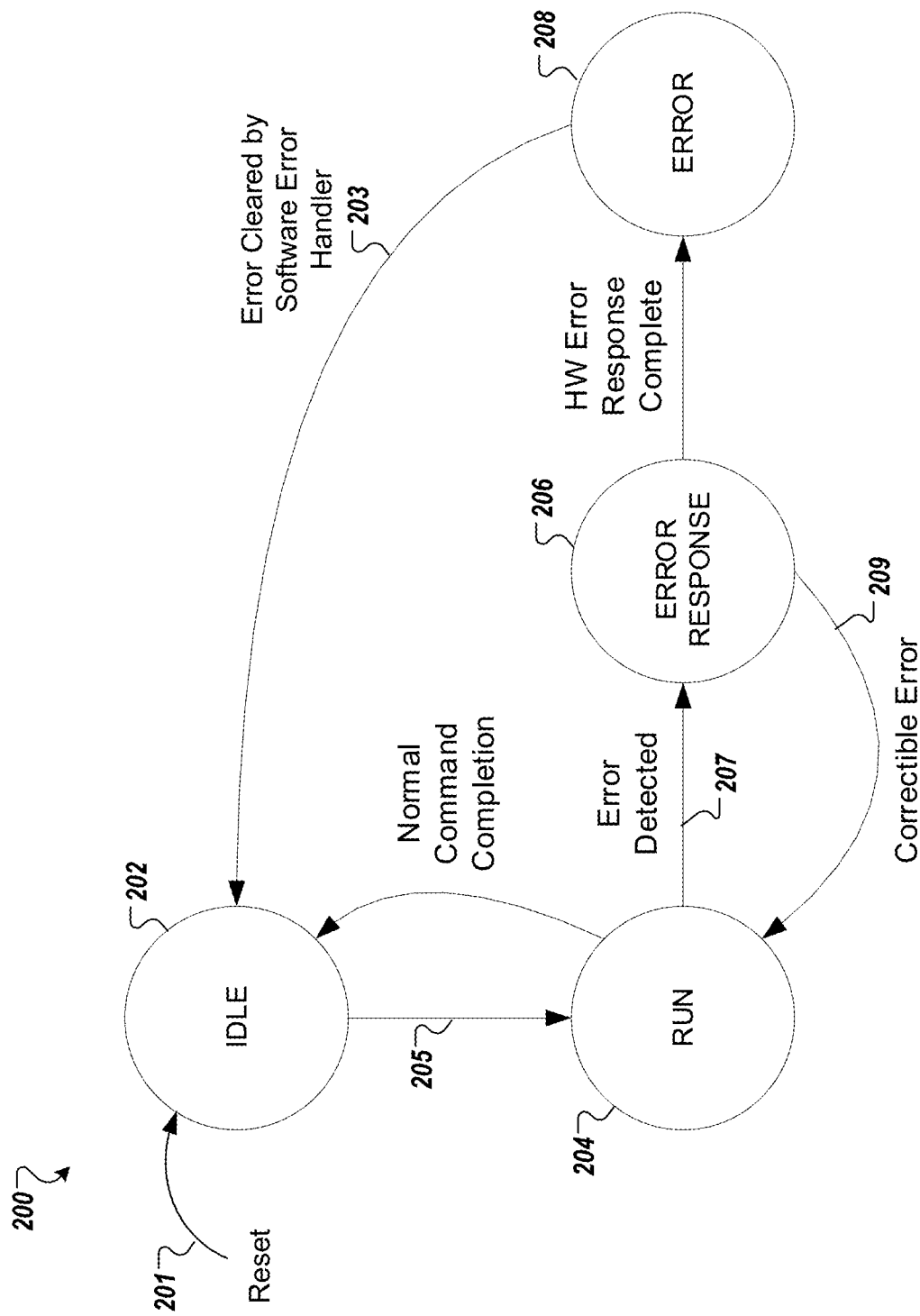
FIG. 2 is a state diagram of a hardware state machine for error classification and handling in a hardware pipeline according to at least one embodiment.

FIG. 2 is a state diagram of a hardware state machine 200 for error classification and handling in a hardware pipeline according to at least one embodiment. The hardware state machine 200 includes an IDLE state 202, a RUN state 204, an ERROR RESPONSE state 206, and an ERROR state 208. The IDLE state 202 can be entered into after a reset 201 or after a software error handler clears 203. The RUN state 204 is when a hardware pipeline is operating normally. The RUN state 204 can be entered from the IDLE state 202 when the hardware pipeline is enabled 205 by a command to process data. When the hardware pipeline completes the command to process data, the hardware state machine 200 transitions from the RUN state 204 to the IDLE state 202. During the RUN state 204, error detection logic can detect an error 207 in the hardware pipeline, and the hardware state machine 200 transitions to the ERROR RESPONSE state 206. As described above, in the ERROR RESPONSE state 206, hardware can perform an error-response action. If a correctable error 209 is detected, the hardware state machine 200 can transition from the ERROR RESPONSE state 206 to the RUN state 204. If the error-response action is completed 211, the hardware state machine 200 can transition from the ERROR RESPONSE state 206 to the ERROR state 208. In the ERROR state 208, the hardware state machine 200 halts the hardware pipeline and reports the error to the software error handler. The error can be reported as an error signature in at least one embodiment. As described above, in the ERROR state 208, the error can be cleared 203 by the software error handler, which transitions the hardware state machine 200 to the IDLE state 202.

In another embodiment, the hardware state machine 200 includes a first state in which the error is detected, a second state in which the error-response action is performed, and a third state in which the hardware pipeline is halted, and the error is reported to an external system (e.g., software error handler).

Figure 3A:
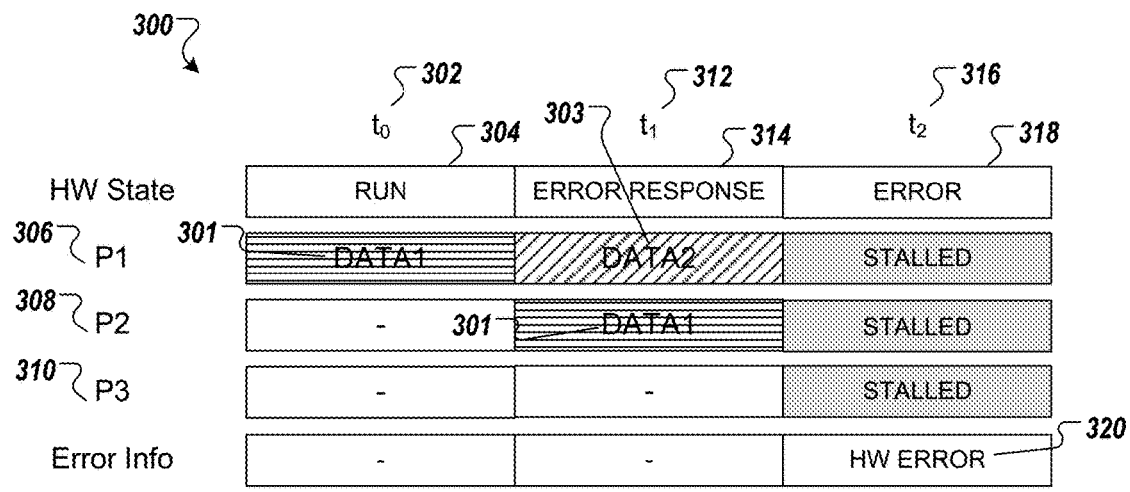
FIG. 3A is a diagram showing states of pipeline stages of a hardware pipeline when a fatal hardware error is detected according to at least one embodiment.

FIG. 3A is a diagram 300 showing states of pipeline stages of a hardware pipeline when a fatal hardware error is detected according to at least one embodiment. At a first time 302 ($t_0$), the hardware pipeline is in a RUN state 304, similar to the RUN state 204 of FIG. 2 described above. At the first time 302 ($t_0$), the hardware pipeline includes a first pipeline stage 306 in which the first data 301 is being processed. At the first time 302 ($t_0$), there is no data in a second pipeline stage 308, and a third pipeline stage 310. There is no error information to be reported at the first time 302 ($t_0$) since no error has been detected.

At a second time 312 ($t_1$), the hardware pipeline is in an ERROR RESPONSE state 314, similar to the ERROR RESPONSE state 206 of FIG. 2 described above. The ERROR RESPONSE state 314 can also be considered a pre-error state. At the second time 312 ($t_1$), the first pipeline stage 306 processes second data 303, and the second pipeline stage 308 processes the first data 301. At the first time 302 ($t_0$), an error is detected in the second data 303. The first data 301 is error-free data. In this embodiment, the control logic determines that the error in the second data 303 is a fatal error detected in the first pipeline stage 306 at the second time 312 ($t_1$). Since the error is detected at the second time 312 ($t_1$), the hardware pipeline is transitioned to the ERROR RESPONSE state 314 at the second time 312 ($t_1$) from the RUN state 304 at the first time 302 ($t_0$). In the ERROR RESPONSE state 314, the control logic can perform an error-response action. In this embodiment, the error-response action includes halting all pipeline stages 306, 308, 310 of the hardware pipeline. At a third time 316 ($t_2$), the hardware pipeline is transitioned to an ERROR state 318, similar to the ERROR state 208 of FIG. 2 described above. At the third time 316 ($t_2$), the first pipeline stage 306, the second pipeline stage 308, and the third pipeline stage 310 are halted (i.e., stalled). Since the error is detected at the second time 312 ($t_1$), there is hardware error information 320 to be reported at the third time 316 ($t_2$).

Figure 3B:
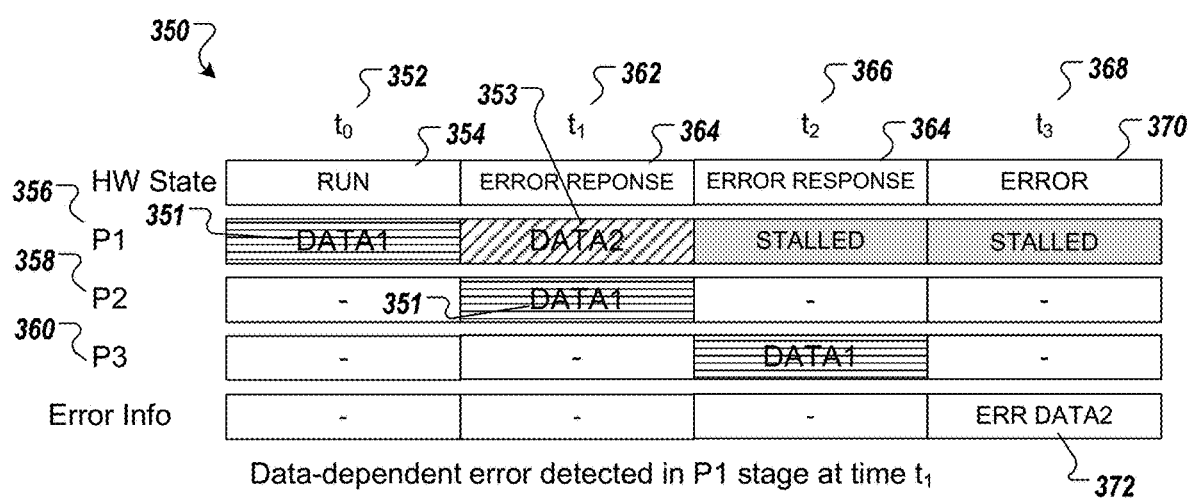
FIG. 3B is a diagram showing states of pipeline stages of a hardware pipeline when a data-dependent error is detected according to at least one embodiment.

FIG. 3B is a diagram 350 showing states of pipeline stages of a hardware pipeline when a data-dependent error is detected according to at least one embodiment. At a first time 352 ($t_0$), the hardware pipeline is in a RUN state 354, similar to the RUN state 204 of FIG. 2 described above. At the first time 352 ($t_0$), the hardware pipeline includes a first pipeline stage 356 in which first data 351 is being processed. At the first time 352 ($t_0$), there is no data in a second pipeline stage 358 and a third pipeline stage 360. There is no error information to be reported at the first time 352 ($t_0$) since no error has been detected.

At a second time 362 ($t_1$), the hardware pipeline is in an ERROR RESPONSE state 364, similar to the ERROR RESPONSE state 206 of FIG. 2 described above. The ERROR RESPONSE state 364 can also be considered a pre-error state. At the second time 362 ($t_1$), the first pipeline stage 306 processes second data 353, and the second pipeline stage 358 processes the first data 351. At the first time 352 ($t_0$), an error is detected in the second data 353. The first data 351 is error-free data. In this embodiment, the control logic determines that the error in the second data 353 is a data-dependent error detected in the first pipeline stage 356 at the second time 362 ($t_1$). Since the error is detected at the second time 362 ($t_1$), the hardware pipeline is transitioned to the ERROR RESPONSE state 364 at the second time 362 ($t_1$) from the RUN state 354 at the first time 352 ($t_0$). In the ERROR RESPONSE state 364, the control logic can perform an error-response action. In this embodiment, the error-response action includes halting the first pipeline stage 306 while allowing the second pipeline stage 358 and the third pipeline stage 360 to continue to process data. In this example, the second pipeline stage 358 continues to process the first data 351. At a third time 366 ($t_2$), the hardware pipeline continues in the ERROR RESPONSE state 364. At the third time 366 ($t_2$), the first pipeline stage 356 is halted (i.e., stalled), and the second pipeline stage 358 and the third pipeline stage 360 continue to process data. In this example, the third pipeline stage 360 continues to process the first data 351. In this example, the second pipeline stage 358 does not process data since the second data 353 has not completed processing by the first pipeline stage 356 and the second pipeline stage 358. At a fourth time 368 ($t_3$), the hardware pipeline transitions to an ERROR state 370, similar to the ERROR state 208 of FIG. 2 described above. At the fourth time 368 ($t_3$), the first pipeline stage 306 is still halted, and the second data 353 has completed processing by the hardware pipeline. At the fourth time 368 ($t_3$), there is error information about the error in the second data 353 to be reported.

It should be noted that in other embodiments, the hardware pipeline can include more pipeline stages than two pipeline stages. In other embodiments, the errors can be detected in other later pipeline stages than the first pipeline stages 306, 356. In other embodiments, additional errors can be detected in error at subsequent pipeline stages in the hardware pipeline. In this case, the control logic can report the errors according to a priority order assigned to the different categories of the different errors.

Figure 4:
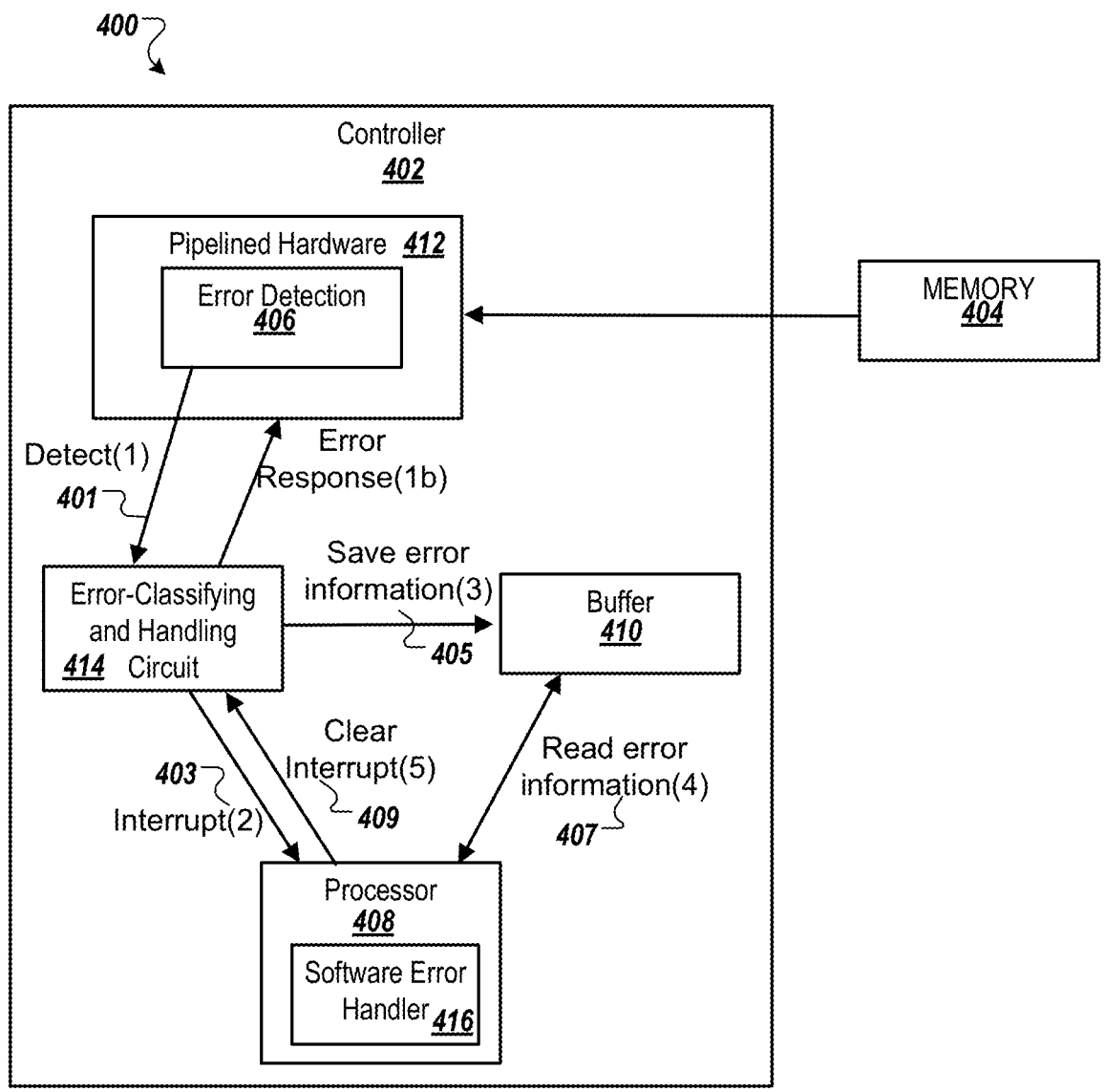
FIG. 4 is a block diagram of an error-classifying and handling circuit in a memory system with a memory device and a controller according to at least one embodiment.

FIG. 4 is a block diagram of an error-classifying and handling circuit 414 in a memory system 400 with a memory device 404 and a controller 402 according to at least one embodiment. The controller 402 includes pipelined hardware 412, a processor 408 (also referred to as a management processor), a buffer structure 410, and error-classifying and handling circuit 414. The error-classifying and handling circuit 414 can perform similar operations as described above with respect to the control logic 106 of FIG. 1. The pipelined hardware 412 can be processing data received from a memory 404 (e.g., DRAM, cache, or the like). In some cases, the data can be read and written from memory 404 between one or more stages of the pipelined hardware 412. During operation, error detection logic 406 can detect an error (401) in the pipelined hardware 412. The error can be different types (e.g., fatal error, data-dependent error, or the like). The error can be detected in a specific position in the pipelined hardware 412 (e.g., a specific pipeline stage). The error can be in a first data set in a data stream, including multiple data sets. The position of the first data set can also be determined. The error detection logic 406 can send an indication of the error to the error-classifying and handling circuit 414. The error-classifying and handling circuit 414 can receive an indication of the error in the first data set from the error detection logic. The error-classifying and handling circuit 414 can classify the error in one of the multiple categories as described above. In at least one embodiment, the error-classifying and handling circuit 414 can classify the error as a data-dependent error based on a type of the error, a position of the first data set in the data stream, and a position of the pipeline stage in the pipelined hardware 412. As described above, the error-classifying and handling circuit 414 can perform an error-response action. In at least one embodiment, the error-classifying and handling circuit 414 can halt only the pipeline stage at which the error is detected to perform a data-dependent, error-response action on the first data. For example, the data-dependent, error-response action can correct the first data. Once corrected, the pipeline stage can be resumed, and subsequent pipeline stages can process the corrected first data. The data-dependent, error-response action can also resume the remaining stages to continue to process antecedent data in the data stream or data from other streams that are free of errors. In another embodiment, the error detection logic 406 can detect a second error in the pipelined hardware 412 and send a second indication of the second error to the error-classifying and handling circuit 414. The error-classifying and handling circuit 414 can classify the second error accordingly.

Once the data-dependent error response is performed (or in connection with performing the data-dependent error response), the error-classifying and handling circuit 414 can assert an interrupt (403) to the processor 408 so that the processor 408 can read the error information. In at least one embodiment, the error-classifying and handling circuit 414 can save the error information (405) in the buffer structure

410. In another embodiment, the error-classifying and handling circuit 414 can store the error information (405) in a specified register of the error-classifying and handling circuit 414 or the controller 402. In response to the interrupt (403), the processor 408 reads the error information (407) and clears the interrupt once handled (409). Asserting the interrupt (403) can trigger an interrupt-handling routine on the processor 408 to read the error information (405) from the buffer structure 410 and clear the interrupt (409). The interrupt-handling routine can take multiple clock cycles, such as tens to hundreds of clock cycles, to read the error information (405) and clear the interrupt (409). Asserting the interrupt (403) can also trigger a demand scrub option to figure out the error type of the detected error. For management of the memory device 404, all error information should be logged and analyzed by the processor 408. The processor 408 can enable Post Package Repair (PPR), perform page-offlining, health monitoring, replace a faulty memory device 404, and/or other management processes based on the error information. In another embodiment, the processor 408 can use the error information to analyze the pipelined hardware 412 and perform remedial actions accordingly. In at least one embodiment, the processor 408 executes a software error handler 416 similar to the software error handler 114 of FIG. 1.

Figure 5:
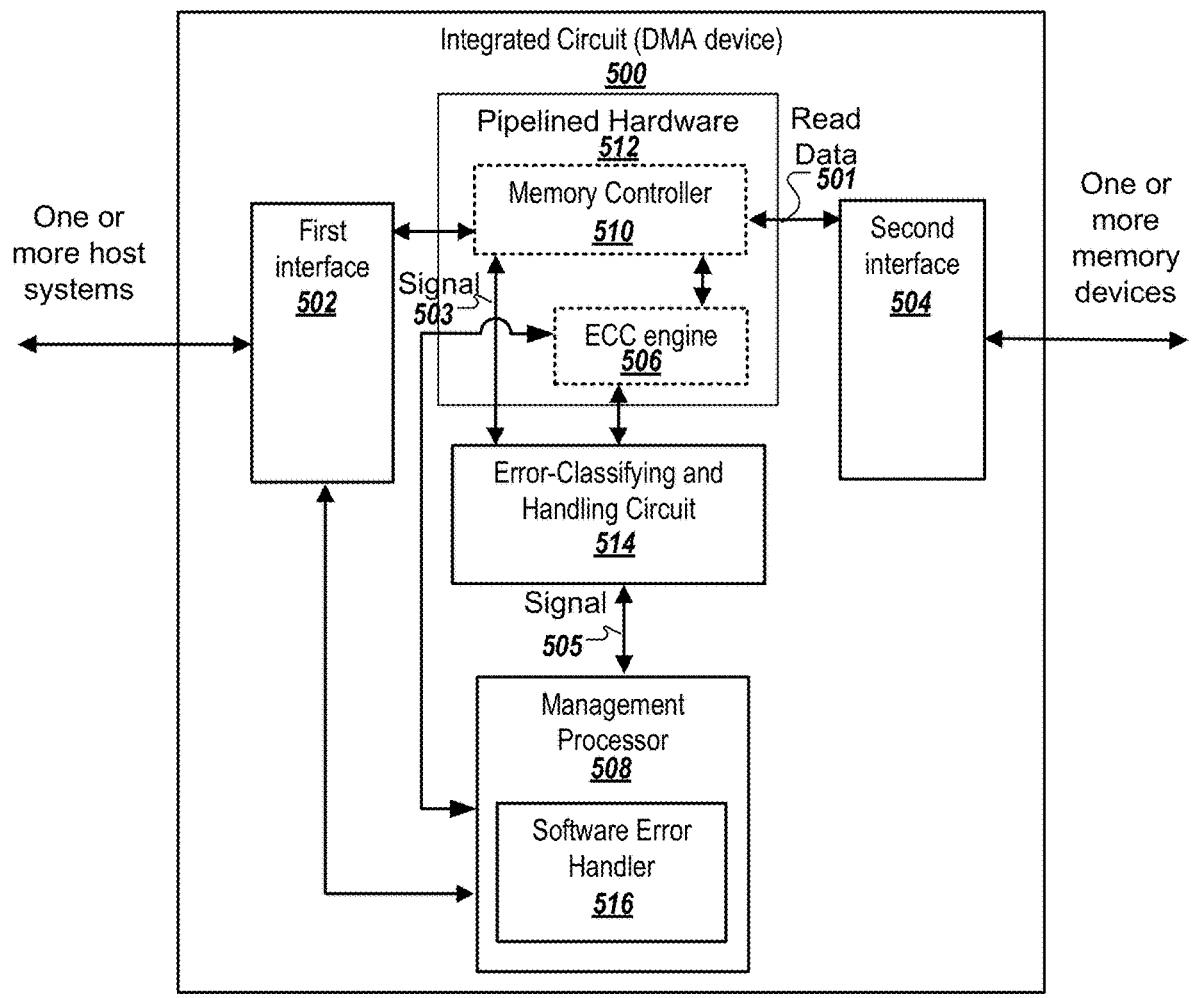
FIG. 5 is a block diagram of an integrated circuit with an error-classifying and handling circuit according to at least one embodiment.

FIG. 5 is a block diagram of an integrated circuit 500 with an error-classifying and handling circuit 514 according to at least one embodiment. The error-classifying and handling circuit 514 is similar to the error-classifying and handling circuit 414 of FIG. 4 or the control logic 106 of FIG. 1. The error-classifying and handling circuit 514 can be used to classify one or more errors detected in pipelined hardware 512 and perform one or more error-response actions according to the classification.

The pipelined hardware 512 can include one or more pipeline stages coupled to a first interface 502 and a second interface 504. The integrated circuit 500 can communicate with one or more hosts over the first interface 502 and one or more memory devices or other peripheral devices over the second interface. The integrated circuit 500 also includes a processor 508 (also referred to as a management processor). The processor 508 can execute a software error handler 516. The software error handler 516 is similar to the software error handler 114 of FIG. 1. The integrated circuit 500 can be part of a DMA device, a security processor, a single-host memory expansion integrated circuit, a multi-host memory pooling integrated circuit, or the like.

In at least one embodiment, the pipelined hardware 512 can include error detection logic to detect an error in the pipelined hardware 512. In at least one embodiment, the pipelined hardware 512 can include a memory controller 510 and an ECC engine 506. The ECC engine 506 can detect an error in read data 501 associated with a read operation over the second interface 504 or in write data associated with a write operation over the second interface 504. In another embodiment, the ECC engine 506 can check data processed by the memory controller 510 before being written to the memory or transferred to one or more hosts over the first interface 502. The ECC engine 506 can be part of the error detection logic described herein. Alternatively, other types of error detection circuits can be used to detect errors in data being processed by the memory controller 510 or other pipeline stages in the pipelined hardware 512.

In at least one embodiment, the error-classifying and handling circuit 514 can send one or more control signals 503 to the memory controller 510 or other circuits of the pipelined hardware 512 in response to classifications of the detected errors. The error-classifying and handling circuit 514 can send one or more signals 505 to the processor 508 to report the errors to the software error handler 516. In some cases, the errors can be reported according to a priority hierarchy for the different classifications.

In another embodiment, the processor 508 includes an interrupt-handling routine to read the error information from the error-classifying and handling circuit 514 or a buffer storing the error information. The interrupt-handling routine can clear one or more interrupts asserted by the error-classifying and handling circuit 514.

Figure 6:
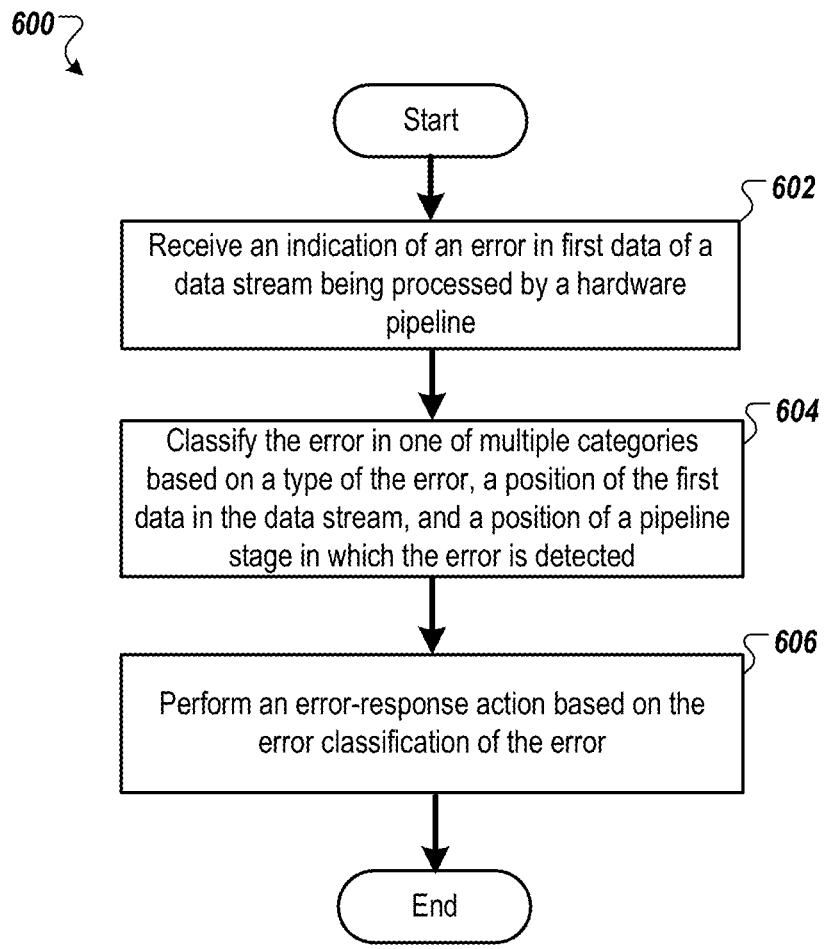
FIG. 6 is a flow diagram of a method of operating an integrated circuit for detecting, classifying, and handling errors detected in a hardware pipeline according to at least one embodiment.

FIG. 6 is a flow diagram of a method 600 of operating an integrated circuit for detecting, classifying, and handling errors detected in a hardware pipeline according to at least one embodiment. The method 600 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 600 is performed by the computing system 100 of FIG. 1. In another embodiment, the control logic 106 of FIG. 1 performs the method 600. In another embodiment, the error classification logic 108, the error reporting logic 110, and the error response logic 112 perform the method 600 or portions of the method 600. In another embodiment, the hardware state machine 200 of FIG. 2 performs the method 600. In another embodiment, the controller 402, or the error-classifying and handling circuit 414, performs the method 600. In another embodiment, the integrated circuit 500, or the error-classifying and handling circuit 414, performs the method 600.

Referring to FIG. 6, the method 600 begins by the processing logic receiving an indication of an error in first data of a data stream being processed by a hardware pipeline with a set of pipeline stages (block 602). The processing logic classifies the error in one of a set of categories based on a type of the error, a position of the first data in the data stream, and a position of a pipeline stage in the hardware pipeline in which the error is detected (block 604). The processing logic performs an error-response action based on the error classification of the error (block 606), and the method 600 ends. In at least one embodiment, the processing logic performs a data-dependent, error-response action in response to the error being classified as a data-dependent error.

In a further embodiment, the processing logic controls one or more pipeline stages, subsequent to the pipeline stage in which the error is detected in the hardware pipeline, to complete processing antecedent data in the data stream. In another embodiment, the processing logic reports the error to a software error handler after the one or more pipeline stages complete processing the antecedent data in the data stream.

In another embodiment, the processing logic receives a second indication of a second error in second data in the data stream being processed by the hardware pipeline. The processing logic classifies the second error in another one of the set of categories based on a second error type, a position of the second data in the data stream, and a position of a pipeline stage in the hardware pipeline in which the second error is detected. The processing logic performs a second error-response action, different from the error-response action, based on the error classification of the second error.

In another embodiment, a subsequent pipeline stage includes second data in the data stream antecedent to the first data that triggered the error. The second data is error-free data. In this embodiment, the processing logic can continue to process the second data in the subsequent pipeline stage and any other subsequent pipeline stages, assuming the pipeline stages are not halted. In at least one embodiment, the first data is a first data set in the stream, including one or more additional data sets.

The processing logic reports the error to a software error handler in at least one embodiment. In at least one embodiment, the processing logic controls one or more pipeline stages, subsequent to the pipeline stage in which the error is detected in the hardware pipeline, to complete processing antecedent data in the data stream before reporting the error to a software error handler.

In one embodiment, the processing logic detects an error while the hardware pipeline is in a first state, such as the RUN state described above. The processing logic can perform an error-response action in a second state, such as the ERROR RESPONSE state described above. The processing logic can halt the hardware pipeline and report the error in a third state, such as the ERROR state described above.

In at least one embodiment, the error detected at block 602 is classified as a first category at block 604. As part of the error-response action, the processing logic can halt the hardware pipeline responsive to the error being classified as the first category. In at least one embodiment, the error detected at block 602 is classified as a second category at block 604. The processing logic can, as part of the error-response action, halt the pipeline stage in which the error is detected while allowing pipeline stages, subsequent to the pipeline stage in which the error is detected in the hardware pipeline, to continue processing error-free data, responsive to the error being classified as the second category. In at least one embodiment, the first category specifies that the error is a fatal hardware error, and the second category specifies that the error is a data-dependent error.

As described herein, the processing logic can detect and classify multiple errors. The processing logic can determine a priority order of the multiple errors and report the multiple errors according to the priority order. In at least one embodiment, the processing logic reports only one error with the highest priority in the priority order assigned to the categories. For example, a first priority level can be assigned to a first category associated with correctable data errors, a second level can be assigned to a second category associated with uncorrectable data errors, and a third level can be assigned to a third category associated with fatal errors. Since the third category is associated with fatal errors, the third level can be the highest, whereas the first level can be the lowest.

The processing logic can perform a data-dependent, corrective action to correct the data in another embodiment. The processing logic can also perform other operations to support multiple data channels in the hardware pipeline or out-of-order operations in the hardware pipeline.

It is to be understood that the above description is intended to be illustrative and not restrictive. Many other implementations will be apparent to those of skill in the art upon reading and understanding the above description. Therefore, the disclosure scope should be determined with reference to the appended claims, along with the full scope of equivalents to which such claims are entitled.

In the above description, numerous details are set forth. It will be apparent, however, to one skilled in the art that the aspects of the present disclosure may be practiced without these specific details. In some instances, well-known structures and devices are shown in block diagram form rather than in detail to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, it should be borne in mind that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatuses. Various general-purpose systems may be used with programs in accordance with the teachings herein, or it may prove convenient to construct more specialized apparatuses to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

What is claimed is:

1. A direct memory access (DMA) device comprising:
   a hardware pipeline comprising a plurality of pipeline stages;
   error detection logic to detect an error in the hardware pipeline; and
   control logic to:
      receive an indication of the error from the error detection logic;
      classify the error in one of a plurality of categories based on a type of the error, a position of first data in a data stream that triggered the error, and a position of a pipeline stage in the hardware pipeline in which the error is detected; and
      perform an error-response action based on the error classification of the error, wherein performing the error-response action comprises causing one or more of the plurality of pipeline stages to halt.

2. The DMA device of claim 1, wherein a subsequent pipeline stage comprises second data in the data stream that is antecedent to the first data that triggered the error, wherein the second data is error-free.

3. The DMA device of claim 1, wherein the first data is a first data set, and wherein the hardware pipeline comprises a plurality of data sets, including the first data set, in the data stream.

4. The DMA device of claim 1, wherein the control logic is to perform the error-response action by performing a data-dependent error-response action on the first data.

5. The DMA device of claim 4, wherein the control logic is to control one or more pipeline stages, subsequent to the pipeline stage in which the error is detected in the hardware pipeline, to complete processing antecedent data in the data stream.

6. The DMA device of claim 4, wherein the control logic is to control one or more pipeline stages, subsequent to the pipeline stage in which the error is detected in the hardware pipeline, to complete processing antecedent data in the data stream before reporting the error to a software error handler.

7. The DMA device of claim 1, wherein the control logic is implemented as a hardware state machine or in a microcontroller.

8. The DMA device of claim 1, wherein the control logic comprises a hardware state machine comprising:
   a first state in which the error is detected;
   a second state in which the error-response action is performed; and
   a third state in which the hardware pipeline is halted and the error is reported to an external system.

9. The DMA device of claim 1, wherein the error-response action comprises halting the hardware pipeline responsive to the error being classified as a first category, wherein the error-response action comprises halting the pipeline stage in which the error is detected while allowing pipeline stages, subsequent to the pipeline stage in which the error is detected in the hardware pipeline, to continue processing error-free data, responsive to the error being classified as a second category.

10. The DMA device of claim 9, wherein the first category specifies that the error is a fatal hardware error, and wherein the second category specifies that the error is a data-dependent error.

11. The DMA device of claim 9, wherein the error detection logic is to detect a second error in a subsequent pipeline stage of the hardware pipeline after the error is detected in the pipeline stage, and wherein the control logic is further to:
   receive a second indication of the second error from the error detection logic;
   classify the second error in one of the plurality of categories based on the type of the second error, a second position of second data in the data stream that triggered the second error in the subsequent pipeline stage, and a position of the subsequent pipeline stage in the hardware pipeline in which the second error is detected; and
   perform a second error-response action based on the error classification of the second error.

12. The DMA device of claim 1, wherein the control logic is further to:
   determine a priority order of the error and a second error detected in the hardware pipeline; and
   reporting only one of the error or the second error based on a priority order assigned to the plurality of categories.

13. The DMA device of claim 12, wherein the priority order assigned to the plurality of categories comprises:
   a first priority level for a first category of the plurality of categories associated with correctable data errors;
   a second priority level for a second category of the plurality of categories associated with uncorrectable data errors, wherein the second priority level is higher in priority than the first priority level; and
   a third priority level for a third category of the plurality of categories associated with fatal errors, wherein the third priority level is higher in priority than the second priority level.

14. The DMA device of claim 1, wherein the control logic further comprises at least one of:
   error correction logic to perform a data-dependent, corrective action;
   multi-data channel logic to support multiple data channels in the hardware pipeline; or
   out-of-order logic to support out-of-order data sets in the hardware pipeline.

15. An integrated circuit comprising:
   a plurality of pipeline stages; and
   an error-classifying and handling circuit coupled to the plurality of pipeline stages, wherein the error-classifying and handling circuit is to:
      receive, from error detection logic of a pipeline stage of the plurality of pipeline stages, an indication of an error in first data;
      classify the error as a data-dependent error based on a type of the error, a position of the first data in a data stream, and a position of the pipeline stage in the plurality of pipeline stages; and
      halting only the pipeline stage of the plurality of pipeline stages to perform a data-dependent, error-response action on the first data.

16. The integrated circuit of claim 15, wherein the integrated circuit is a security processor.

17. The integrated circuit of claim 15, wherein the integrated circuit is a direct memory access (DMA) device.

18. A method of an integrated circuit, the method comprising:
   receiving an indication of an error in first data of a data stream being processed by a hardware pipeline comprising a plurality of pipeline stages;
   classifying the error in one of a plurality of categories based on a type of the error, a position of the first data in the data stream, and a position of a pipeline stage in the hardware pipeline in which the error is detected; and performing an error-response action based on the error classification of the error, wherein performing the error-response comprises causing one or more of the plurality of pipeline stages to halt.

19. The method of claim 18, further comprising:

controlling one or more pipeline stages, subsequent to the pipeline stage in which the error is detected in the hardware pipeline, to complete processing antecedent data in the data stream; and reporting the error to a software error handler after the one or more pipeline stages complete processing the antecedent data in the data stream.

20. The method of claim 18, further comprising:

receiving a second indication of a second error in second data in the data stream being processed by the hardware pipeline;

classifying the second error in another one of the plurality of categories based on a type of the second error, a position of the second data in the data stream, and a position of a pipeline stage in the hardware pipeline in which the second error is detected; and performing a second error-response action, different from the error-response action, based on the error classification of the second error.

* * * * *